Dec. 16, 1947. W. H. KLIEVER 2,432,669
ICE INDICATOR
Filed Oct. 24, 1942 5 Sheets-Sheet 1

Inventor
WALDO H. KLIEVER
George H. Fisher
Attorney

Dec. 16, 1947.  W. H. KLIEVER  2,432,669
ICE INDICATOR
Filed Oct. 24, 1942   5 Sheets-Sheet 2

Inventor
WALDO H. KLIEVER

By George H. Fisher
Attorney

Dec. 16, 1947.    W. H. KLIEVER    2,432,669
ICE INDICATOR
Filed Oct. 24, 1942    5 Sheets-Sheet 4

Inventor
WALDO H. KLIEVER
BY George H. Fisher
Attorney

Inventor
WALDO H. KLIEVER

George H. Fisher
Attorney

UNITED STATES PATENT OFFICE 2,432,669

ICE INDICATOR

Waldo H. Kliever, Minneapolis, Minn., assignor to Minneapolis-Honeywell Regulator Company, Minneapolis, Minn., a corporation of Delaware Application October 24, 1942, Serial No. 463,259

16 Claims. (Cl. 177—311)

The present invention is directed broadly to a sensitive system for responding electronically to an impedance which varies in accordance with variations in a condition for operating an indicator or control device, or both. Although this system has broad applications, it is designed specifically to operate as an ice indicator. The invention also embodies a pick-up unit on which the ice may be formed, this pick-up unit having an impedance which is varied in accordance with the thickness of the ice formation.

In connection with airplanes it is highly desirable that some ready means be provided for indicating to the pilot the thickness of the ice formation on the wings and other surfaces of his plane when he is flying during icing conditions, and it may also be desirable at times, where the plane has de-icing equipment, that this equipment be turned on automatically when the ice formation reaches a predetermined thickness.

It is a principal object of the present invention to provide an ice indicator for external surfaces which may be suitable for use on an airplane to provide the pilot with a ready indication of the thickness of the ice formation on the wings of his plane. A further object of the invention is to provide a means for automatically energizing the de-icing equipment when the thickness of the ice formation reaches a predetermined value.

A further object of the invention is to design a pick-up unit for use in combination with an ice indicator system, which unit may be readily mounted upon the leading edge of the wing of an airplane. A still further object of the invention is to so design this unit that it may be mounted flush with the leading edge of the wing with the amplifier unit and circuit wiring of the system located inside of the wing so as not to disturb the streamline contour of the wing surface.

Still another object of the invention is to mount the pick-up unit directly beneath the de-icing boot on the wing of the airplane so that this unit will indicate whether or not all of the ice has been removed following an operation of the de-icing boot, it also being contemplated that this unit may control the energization of the de-icing boot when the ice formation thereon has reached a predetermined thickness.

This invention contemplates that the pick-up unit shall operate on the capacitance principle, the pick-up unit including one plate of a condenser so positioned that the capacity of the condenser will be varied in accordance with the thickness of the ice formation on the unit and on the wing of the airplane on which the unit is mounted. A further object of the invention is to completely insulate the condenser plate from the ice formation. It is well known that changes in temperature will vary the dielectric properties of the insulation and it is therefore a further object of this invention to provide a second condenser which will compensate the first condenser for variations in temperature so that the indicating system will respond only to the thickness of the ice formation and there will be no error introduced as a result of temperature changes.

Where the pick-up unit is mounted beneath the de-icing boot on the wing of an airplane, it is a further object of the invention to compensate the system for the effect of temperature changes upon the dielectric properties of the de-icing boot as well as for the insulation for the condenser plate of the pick-up unit.

Still another object of the invention is to provide an electronic oscillator and amplifier unit for detecting the changes in capacity of the ice responsive condenser, and to mount this unit within the wing of the airplane upon a plurality of rubber shock absorbers of novel design for the purpose of absorbing the vibrations and shocks to which the wing is subjected. A still further object of my invention is to provide a novel electrical circuit which can be used for detecting changes in the capacity of a condenser and which will amplify these changes in order to perform some useful work such as operating an indicator or controller. It is a further object of the invention to utilize a combined electronic oscillator and impedance bridge circuit and to provide an electronic device which will control the flow of electrons in accordance with the amount of unbalance of the bridge. An additional object of the invention is to utilize an oscillator circuit whose output will be varied in accordance with the capacity of the variable capacity condenser. It is contemplated that vacuum tubes of the pentagrid type may be used in connection with the above circuit.

These and other objects will readily become apparent as the following specification is read in the light of the accompanying drawings in which.

Figure 1:
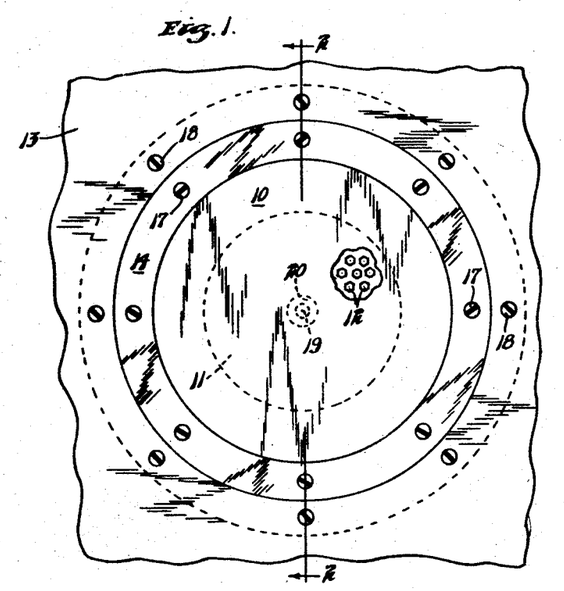
Figure 1 is a face view of a preferred form of pick-up unit showing the unit mounted flush with the leading edge of the wing of an airplane.
Figure 2:
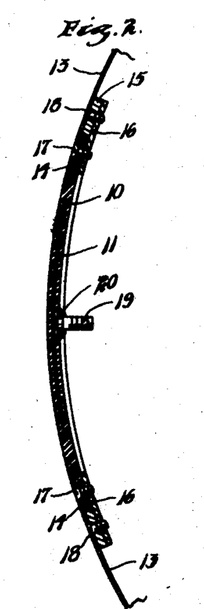
Figure 2 is a sectional view taken along the line 2—2 of Figure 1.

Referring now to Figures 1 and 2 of the drawings, the reference character 10 indicates a curved disk of insulating material such as Lucite or Plexiglas. A relatively small metallic disk 11 is moulded directly in the center of the insulating disk 10, and is provided with hexagonal perforations 12, as seen in Figure 1, over its entire surface. The insulating member 10 is designed to take the shape of, and be mounted flush with, the leading edge of the wing of an airplane which is shown in section at 13 in Figure 2. Member 10 is mounted within an opening in the wing 13 by means of a mounting ring 14 which may preferably be moulded directly in the insulating member 10, and by the spacer 15 and annular backing ring 16, all of which are held together and securely fastened to the wing 13 by means of the screws 17 and 18. The pick-up unit is thus entirely flush with the leading edge of the wing and does not disturb the streamlining thereof. Moreover the metallic disk 11 which forms one plate of the condenser of the pick-up unit, is completely insulated from any ice which may form on the outer surface of the insulating member 10. A connector 19 has an enlarged head 20 which is moulded directly into the insulating member 10 and which is electrically connected to the condenser plate 11, this connector being in turn connected to the electrical amplifier unit by a cable (not shown).

Figure 3:
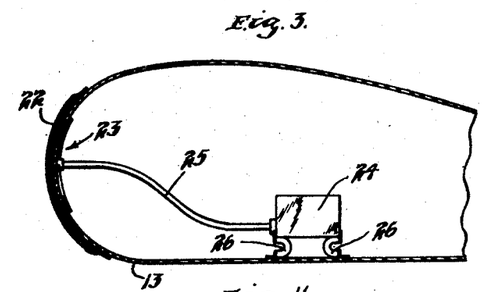
Figure 3 is a sectional view of a wing showing the pick-up unit mounted beneath a de-icing boot with the impedance bridge and amplifying unit mounted on the floor of the wing.

The wing 13 and mounting ring 14 are suitably grounded to the plane and act as the other plate of the condenser, so that the capacity of the condenser is determined by the dielectric properties of the insulating member 10 and the thickness of the ice which forms on the outer surface of the insulating member 10 and over the surface of the wing 13.

Where the wing of the plane is provided with a de-icing boot it is possible to mount the above described unit in the wing of the plane directly behind the de-icing boot. Such an arrangement is shown in Figure 3, the de-icing boot being shown at 22 and the pick-up unit being indicated generally at 23. The reference character 24 indicates the amplifying unit which responds electrically to variations in the oscillating electric field of the condenser produced by the ice, which changes the effective capacity of the pick-up unit 23 and amplifies these responses so that they can be used to perform some useful work such as the operation of an indicator or the operation of an automatic control for the de-icing boot. The unit 24 is connected to the pick-up unit 23 by means of a co-axial cable 25, and the unit 24 is mounted on the floor of the wing 13 by means of U-shaped rubber shock absorbers 26 which will be described in more detail later.

Figures 4, 5, 6, 7:
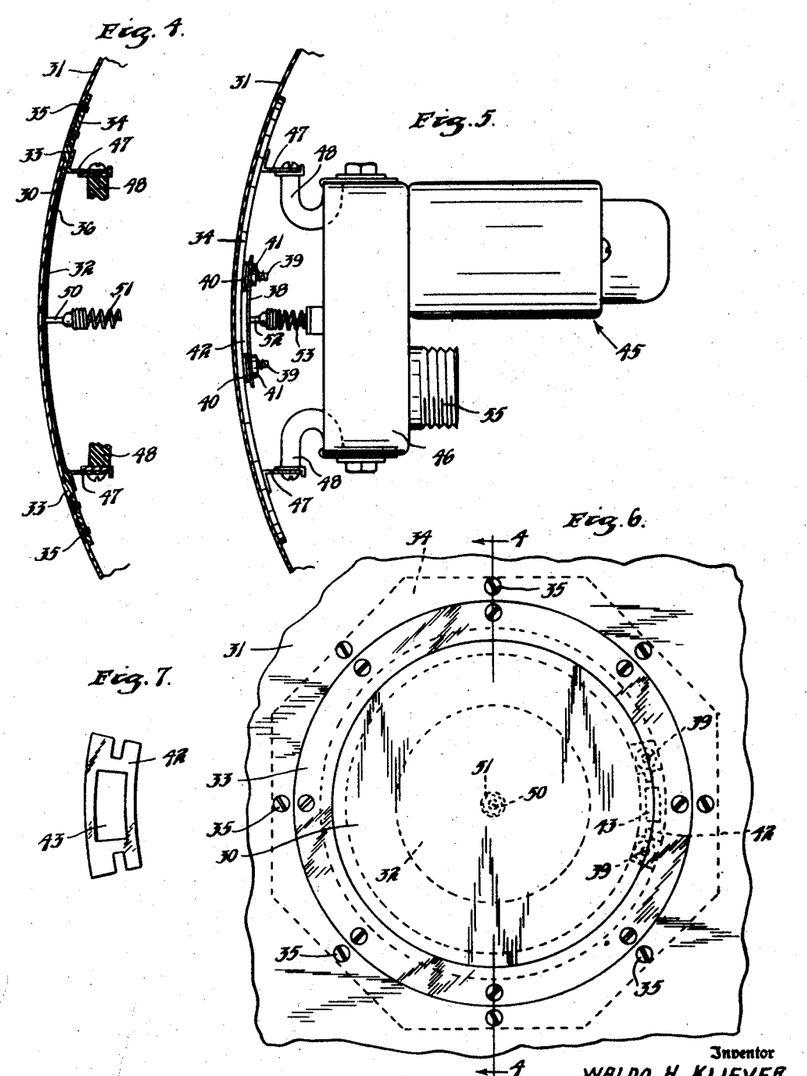
Figure 4 is a sectional view taken along the line 4—4 of Figure 6, of a modified form of pick-up unit shown mounted flush with the leading edge of the wing of an airplane.
Figure 5 is a side view showing how the impedance bridge and amplifying unit may be mounted directly on the pick-up unit.
Figure 6 is a face view of the pick-up unit shown in Figure 4.
Figure 7 is a detailed view of the insulating member which forms the dielectric of the temperature compensating condenser shown in Figure 5.

A modified form of pick-up unit has been shown in Figures 4 to 7. Referring first to Figure 4, the reference numeral 30 indicates a curved disk of insulating material such as Bakelite, which is pre-formed to assume the shape of the leading edge of the wing of an airplane which is indicated at 31. Suitably mounted directly behind the outer surface of the disk 30 is a smaller metallic disk 32 which is adapted to form one plate of a variable capacity condenser, the other plate being formed by the wing of the airplane and a metallic mounting ring 33 into which the disk 30 fits. The mounting ring 33 is connected to a backing ring 34 and the entire unit is mounted in an opening in the wing 31 and is mounted flush therewith by means of the mounting screws 35. A relatively thin sheet 36 of insulating material is placed over the rear face of the insulating disk 30 for the purpose of insulating and protecting the condenser plate 32. It will be clear that the disk 30 completely insulates and protects the condenser plate 32 from any ice which may form on the outer face of the disk 30.

A second condenser plate 38 is mounted adjacent the mounting ring 33 by means of pins 39, spacers 40, and insulating sleeves 41 so that the plate 38 is completely insulated from the mounting ring 33 which of course is grounded to the wing of the airplane. Between the plate 38 and the mounting ring 33 there is placed a member 42 which is composed of the same material which forms the insulating disk 30, which in this case is preferably Bakelite. The member 42 is provided with a central opening 43 so that when the pick-up unit is mounted directly behind the de-icing boot as shown in Figure 3, the cut-away portion 43 may receive a piece of material from which the de-icing boot is made.

As will be explained more fully later, the purpose of this second condenser is to form a temperature compensator for the first condenser. Inasmuch as both of the condensers have a common plate, that is, the mounting ring 33, it will be clear that they will be subject to the same temperature variations, and therefore the second condenser may be designed to properly compensate the first for temperature variations. The second condenser is so positioned, however, that its capacity will be unaffected by formations of ice on the outer face of the insulating member 30.

An electronic detecting and amplifying unit is indicated generally at 45 of Figure 5 and is shown as being supported by means of a base 46. The base 46 is in turn supported on the mounting plate 33 by means of brackets 47 and a plurality of U-shaped resilient shock absorbers 48 which may be made of some suitable resilient material such as rubber. Preferably four such shock absorbers are used, two being placed on the lower side of the base 46 as seen in Figure 5 and two on the upper side. Only two of the shock absorbers are seen in Figure 5 due to the fact that the other two are directly behind them. The condenser plate 32 is electrically connected to the unit 45 by means of a pin 50 and flexible conductor 51, and the condenser plate 38 is connected to the unit 45 by means of a pin 52 and flexible conductor 53. The common condenser plate which is formed by the mounting ring 33 is of course grounded to the wing of the airplane. The connections from the power supply, and meter and/or control mechanism are made at 55.

Figures 8, 9:
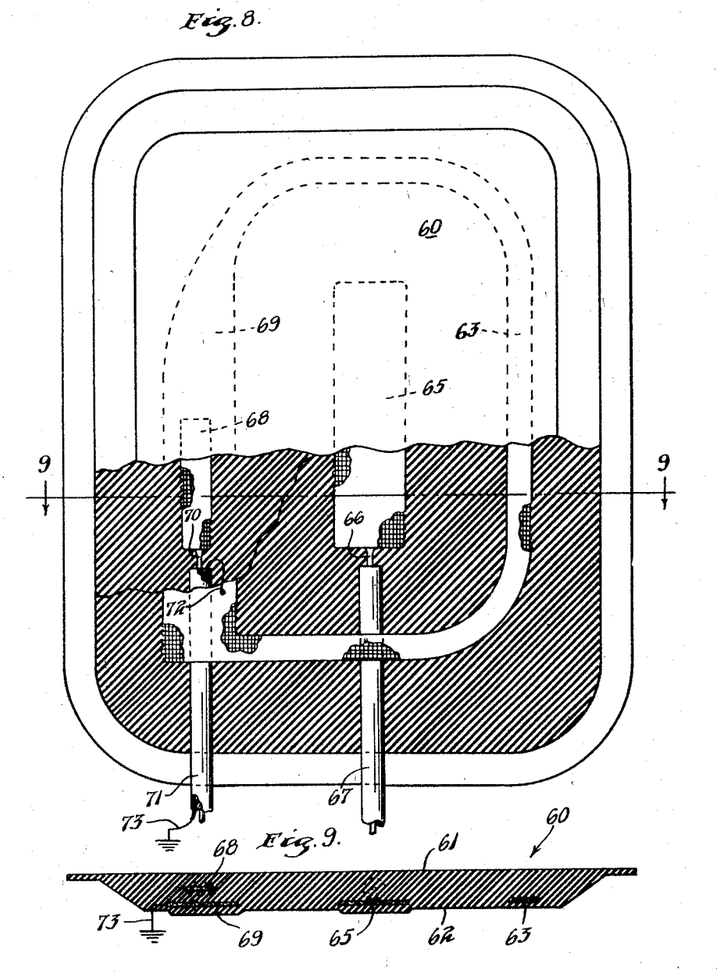
Figure 8 is a face view, partly in section, showing a further form of pick-up unit.
Figure 9 is a sectional view taken along the line 9—9 of Figure 8.

A different form of pick-up unit is shown in Figures 8 and 9. The body of this form of pick-up unit is made of rubber or some equivalent material indicated at 60 and is moulded to have a flat surface 61 and a raised surface 62. A first annular condenser plate in the form of a wire screening or braided wire, is of annular form as indicated at 63 and is moulded directly into the body 60 of the pick-up unit. A second condenser plate 65, which may be made of the same material as the plate 63 is also moulded into the body 60 and is located inside of the annular plate 63. The plate 65 is connected to the central conductor 66 of a co-axial cable 67 which extends outside of the body 60 for connection to the detector and amplifying unit with which this pick-up unit is adapted to cooperate. A third relatively small condenser plate 68 which may also be made of the same material as the other two condenser plates is moulded into the body 60 of the pick-up unit and located adjacent an enlarged portion 69 of the plate 63. It is understood of course that the body of the pick-up unit 60 is of insulating material and therefore electrically insulates each of these condenser plates from the other. The condenser plate 68 is electrically connected to the central conductor 70 of the co-axial cable 71 which extends outside of the body 60 for the purpose of connecting the condenser plate 68 to the detector and amplifying unit. If these plates are made out of screening, care should be taken to see that all of the wires forming the screen are electrically connected.

The condenser plate 63 of this unit corresponds to the condenser plate formed by the mounting ring and airplane wing of the other units and therefore this plate should be grounded. This is accomplished by electrically connecting plate 63 to the outer metallic shield of the co-axial cable 71 by means of the conductor 72, this shield being grounded as indicated diagrammatically at 73.

Figure 10:
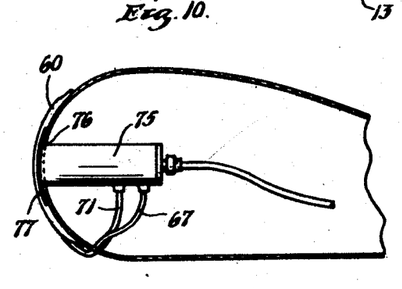
Figure 10 is a sectional view, taken along the line 10—10 of Figure 11, of the wing of an airplane showing the manner in which the pick-up unit of Figure 8 may be mounted upon the leading edge of the wing, and the manner in which the bridge and amplifying unit may be mounted.
Figure 11:
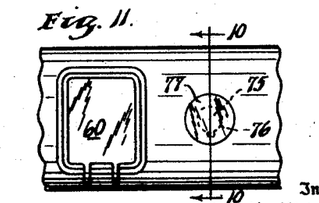
Figure 11 is a face view of the pick-up unit and bridge and amplifier unit of Figure 10.

This pick-up unit is adapted to be mounted by cementing the flat surface 61 to the leading edge of the wing of an airplane as indicated in Figures 10 and 11. The unit being very flexible can be made to assume practically any shape and is therefore adapted to be mounted on a great number of different types of surfaces. If desired, the detector and amplifying unit, when used in combination with this type of pick-up unit, may be mounted in a tubular casing 75 of relatively small diameter and inserted through an opening 76 in the wing surface and mounted therein by means of the mounting plate 77. The cables 67 and 71 are inserted through openings in the wing and connected to the housing 75.

It will be understood that with the unit 60 mounted on the surface of the wing of an airplane, when ice forms on the raised surface 62 the capacity between the plate 65 and the plate 63 will be varied. The two plates 63 and 65 therefore form the ice responsive condenser. The plate 68 cooperating with the plate 63 acts as a temperature compensating condenser for compensating the first condenser for the effect of temperature variations upon the dielectric properties of the rubber in which the various plates are moulded. This action will be described more in detail when the circuit arrangement is discussed.

Figure 12:
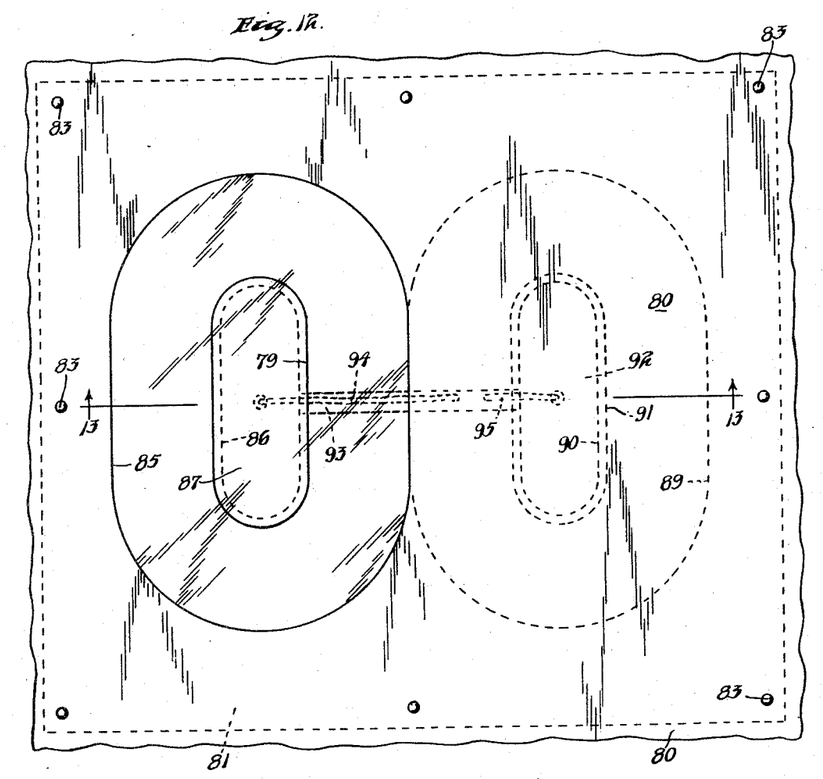
Figure 12 is a face view of a still further form of pick-up unit.
Figure 13:
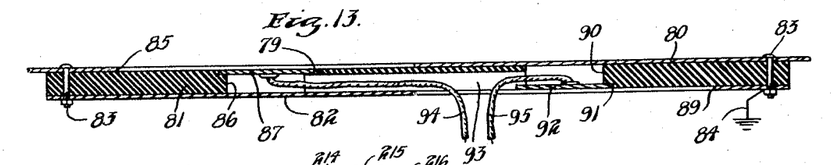
Figure 13 is a sectional view taken along the line 13—13 of Figure 12.

A still different form of pick-up unit is disclosed in Figures 12 and 13. This unit is adapted to be mounted upon an external metallic surface indicated at 80. A spacer 81 of some suitable insulating material such as Bakelite, and a metallic backing plate 82 are carried by the member 80 by means of the fasteners 83 which also act to electrically connect the backing plate 82 and the member 80. These units are grounded as indicated diagrammatically at 84. The member 80 has an oval opening therein as indicated at 85 and the Bakelite member 81 has a similar oval opening 86 which is concentric with respect to the opening 85. The Bakelite member 81 is provided with a shoulder 79 surrounding the oval opening 86 and an oval metallic plate 87 is seated on the shoulder 79 as shown in Figure 13. This member 87 acts as one plate of a condenser, the other plate being the member 80. A sheet of mica, Celluloid or other insulating material is placed within the opening 85 of the member 80 and lies flush therewith to protect the plate 87 from any moisture or ice forming upon the surface of the unit.

The backing member 82 is provided with an oval opening 89 and the Bakelite member 81 is provided with a smaller opening 90 which is concentric with the opening 89. The Bakelite member 81 is provided with a shoulder 91 surrounding the oval opening 90 in which a metallic disk 92 is seated. A groove 93 in the Bakelite member connects the two openings 86 and 90. If desired, an insulating sheet such as Celluloid may be placed within the opening 89 and flush with the surface of the backing member 82. The groove 93 accommodates a conductor 94 which is electrically connected to the plate 87 and also a conductor 95 which is electrically connected to the plate 92, these conductors being utilized to connect these two plates to the detecting and amplifying unit. It will be understood of course that this pick-up unit may be bent to conform to the shape of the wing of an airplane in the same manner as the other pick-up units.

The condenser formed by the plate 87 and the member 80 will vary in capacity in accordance with the thickness of any ice which may form upon the upper surface of the member as viewed in Figure 13. The condenser formed by the plate 92 and the backing member 82 is not affected by ice formation on the upper surface of the unit. This condenser however will be affected by temperature changes in the same manner as the condenser formed by the plates 87 and 80 and therefore will compensate the latter for temperature changes. This unit is absolutely symmetrical and therefore perfectly compensated for variations in temperature.

Figure 14:
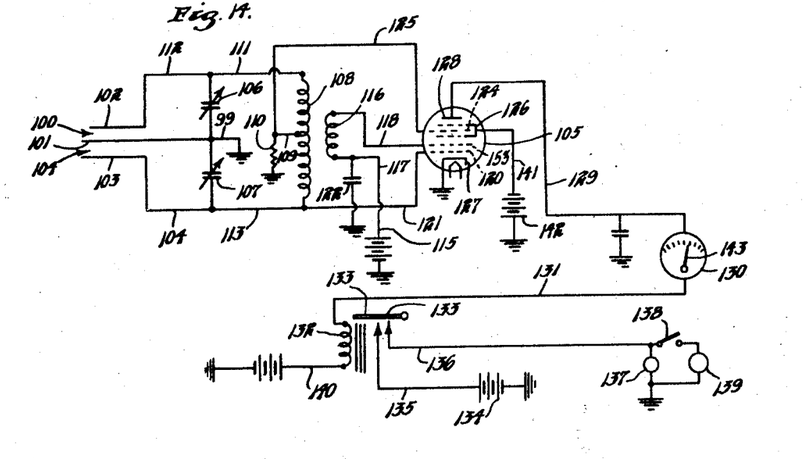
Figure 14 is a schematic diagram of one circuit arrangement which may be used to detect and amplify variations in the capacity of the condenser formed by the pick-up unit.

Figure 14 diagrammatically illustrates one circuit arrangement which may be utilized for detecting and amplifying changes in capacity of the condenser of any one of the pick-up units described above, for the purpose of controlling an indicating meter, signal light or buzzer, or a control mechanism for a de-icer unit. The ice responsive condenser is indicated generally at 100 and comprises a first plate 101, which is grounded as diagrammatically illustrated at 99, and which, as described in connection with the pick-up units disclosed above, may be formed entirely or partially by the wing of the airplane on which the pick-up unit is mounted. The other plate 102 of the condenser 100 is insulated from the ice and the capacity of the condenser 100 depends upon the thickness of the ice formation on the pick-up unit. Where a temperature compensating condenser is used the reference numeral 103 represents the insulated plate of the temperature compensating condenser. This temperature compensating condenser is indicated generally at 104. Such a temperature compensating condenser is desirable at times due to the fact that changes in temperature will vary the dielectric properties of the insulator which protects plate 102 from the ice. Thus upon changes in temperature the dielectric properties of the member separating the plate 103 from the plate 101 will vary in the same degree as the dielectric properties of the member separating the plates 102 and 101. Thus on changes in temperature the capacities of the two condensers 100 and 104 will vary in a like amount. Where this feature is not desired the condenser 104 may take the form of a fixed condenser which may be located along with the detector and amplifying unit.

The detector and amplifier unit comprises an electrical bridge circuit and a vacuum tube 105 of the pentagrid type which cooperates with the bridge circuit to form an oscillator and which also detects bridge unbalance and amplifies the effect. The bridge circuit includes the two condensers 100 and 104 as well as two trimmer condensers 106 and 107 connected in parallel therewith. The bridge circuit also includes an inductance coil 108 which is center tapped as shown at 109 and grounded at this point through resistance 110. The upper end of the coil 108 is connected to the trimmer condenser 106 and plate 102 of the condenser 100 by the two conductors 111 and 112 respectively. The lower end of the coil 108 is connected to the trimmer condenser 107 and the plate 103 of condenser 104 by conductors 113 and 104 respectively. Power is supplied to this circuit through the coil 116 which is located adjacent the coil 108 so as to induce a voltage therein. One end of the coil 116 is connected by the conductor 117 to the plus side of a source of D. C. potential shown at 115. The upper end of the coil 116 is connected by conductor 118 to the grid 153 of the pentagrid tube 105, this grid acting as a plate in this particular circuit. The grid 120 of the tube 105 is connected by conductor 121 to the lower end of the inductance coil 108, this being a feedback connection to cause the system to operate as an oscillator of which the bridge forms the tank circuit. The lower end of the coil 116 is connected to ground through a by-pass condenser 122. Thus when the coil 116 is connected to the source of power through the conductor 117 a voltage will be induced in the coil 108 and by means of the feedback connection 121 and the ground to the grid 120 the bridge will act as an oscillator.

The control grid 124, of the tube 105 is connected by conductor 125 to the center tap 109 of the inductance 108. The grid 124 is protected by the screen grid 126 which is biased negatively by conductor 141 and source of D. C. potential 142. The tube 105 is also provided with the usual grounded cathode 127 and a plate 128. The plate is connected by the conductor 129 to the meter 130 and thence by conductor 131 to the relay winding 132. The relay in turn is connected by conductor 140 to the usual source of plate voltage.

Figure 16:
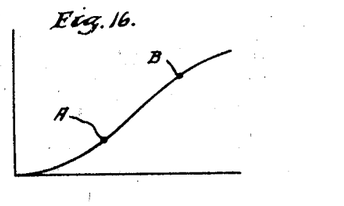
Figures 16 and 17 are graphical representations of relations prevailing in my apparatus.

When the bridge is perfectly balanced the center tap 109 and hence the grid 124 will remain at ground potential thereby preventing the flow of electrons from the cathode 127 to the plate 128. However, when the bridge is off balance the potential of the center tap 109 will oscillate above and below ground potential due to the oscillations in the bridge circuit. This means of course that the potential of the grid 124 will also oscillate above and below ground potential and when the grid is above ground potential the electrons will flow to the plate 128 and cause a flow of current in the plate circuit. In practice, it is desirable to adjust the bridge so that it is slightly unbalanced when there is no ice formation on the pick-up unit so that the tube will pass a slight amount of current. The purpose of this is easily explained by reference to the characteristic curve of the tube as shown in Figure 16. In this curve it will be seen that there is very little increase in plate current until the voltage on the control grid reaches a point opposite point A on the curve. That part of the curve between the points A and B is relatively straight and hence between these values of grid voltage the tube will have a very satisfactory response. Therefore the bridge is normally unbalanced sufficiently when there is no ice on the pick-up unit to bring the tube to a response corresponding to the point A on the curve. This incidentally will cause the needle 143 of the meter 130 to move from an "off" position to a "0" position when power is supplied to the system but before any ice forms on the pick-up unit. The formation of ice on the pick-up unit will further unbalance the bridge and cause the tube to respond along portions A—B of the curve shown in Figure 16. The scale of the meter 130 can then be calibrated to indicate accurately the thickness of the ice formation on the pick-up unit. The relay 132 is adjusted so that it will not pull in until the ice has reached a predetermined thickness on the pick-up unit. When the relay 132 pulls in, it will attract the armature 133 and cause a flow of current from the source of supply 134 through conductor 135, armature 133, and conductor 136 to a signal light or buzzer 137. If desired the manual switch 138 may also be closed to energize any suitable control device 139 for the de-icer. Thus it will be seen that this system may not only be utilized to indicate the exact thickness of the ice formation on the surface on which the pick-up unit is mounted, but may also operate a visual or audible signal to indicate when the thickness of ice exceeds a predetermined value or operate a control device for the de-icer.

As described above, temperature variations at the pick-up unit introduce an error in that they vary the dielectric properties of the insulation between the condenser plates. This error has been compensated for by the temperature compensating condenser.

A second error is introduced by the effect of temperature upon the resistivity of the ice. This tends also to unbalance the bridge. Referring now to the tube 105 it will be clear that the two grids 120 and 124 will cause a flow of electrons to the plate 128 only when they are both positive with respect to the cathode 127. This occurs during only one-half of the wave cycle which is impressed on each grid. Thus they will cause a flow of electrons for one-half cycle when the two voltage waves impressed on the grids are in phase. This is true of the two voltage waves where the bridge is unbalanced due to changes in the dielectric of the pick-up unit.

The resistivity of the ice causes a bridge unbalance of a type which produces a component in the voltage wave impressed on grid 124 which is 90° out of phase with that caused by changes in the dielectric. This component being 90° out of phase with the voltage wave impressed on the grid 120, it follows that the tube will not be as sensitive thereto, and therefore will at least partially eliminate the error due to changes in the resistivity of the ice.

Figure 15:
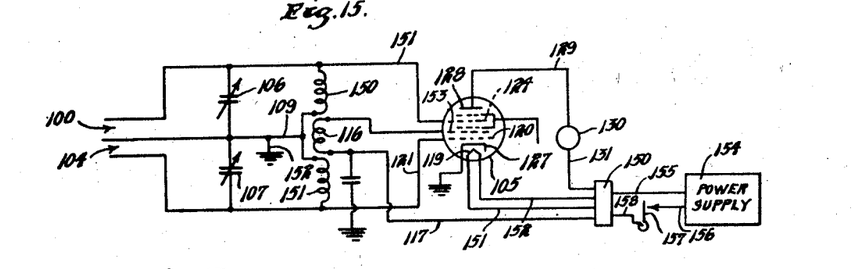
Figure 15 is a diagrammatic view of a modified form of circuit arrangement.

A slightly different type of circuit has been illustrated in Figure 15. This circuit utilizes the same pentagrid tube and the same oscillator circuit with the exception that the inductance coil 108 has now been broken up into two separate coils 150 and 151 with the coil 116 mounted directly between them. Also the center tap 109 is now grounded directly as indicated at 152. The connection to the grid 124 of the tube 105 is now by conductor 151 which connects to the upper end of the coil 150. Inasmuch as the lower end of the coil 150 and the cathode 127 are both connected to the ground, and the grid 124 is connected to the opposite end of the coil 150, it follows that the current flowing in the plate circuit of this tube will depend upon the output of the coil 150.

Actually this system will function as an oscillator and a sympathetic circuit. The oscillator circuit includes the coil 151 and condensers 104 and 107. The sympathetic circuit comprises the coil 150 and the condensers 100 and 106.

The coil 116 is coupled closely with respect to the coil 151 and loosely with respect to the coil 150. Thus when power is supplied to the coil 116 it will induce a voltage in the coil 151 and due to the feedback connection to the grid 120 through the conductor 121, the tank circuit comprising the coil 151 and condensers 104 and 107 will combine with the grid 120 and plate 128 of the pentagrid to form an oscillator. Thus oscillations will be produced in the above tank circuit, and such oscillations will induce similar oscillations in the sympathetic circuit comprising the coil 150 and condensers 100 and 106. When there is no ice present on the pick-up unit, the capacity of the condenser 100 will be relatively low and the sympathetic circuit will be tuned to a different frequency than the oscillator circuit with the result that the output will be relatively low. As the capacity of the condenser 100 is increased due to the formation of ice, the natural frequency will approach that of the oscillator circuit and therefore its output will be increased.

Inasmuch as the center tap 109 is grounded and the cathode 127 of the pentagrid is grounded and the grid 124 is connected to the upper end of the coil 150, it follows that the current flowing in the plate circuit 128 of the pentagrid will be responsive to the output of the coil 150. As pointed out above, this output is dependent upon the amount of ice which is formed on the pick-up unit.

Figure 17:
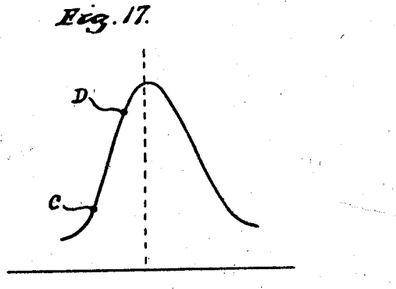

The sympathetic circuit including the condenser 100 may be tuned to a point corresponding to the point C on the resonance curve shown in Figure 17 when there is no ice present on the pick-up unit. As ice forms on the pick-up unit the output of the sympathetic circuit will increase along the line C—D of the resonance curve. Therefore in this circuit, as well as in the circuit shown in Figure 14, there will be a slight flow of current through the tube when there is no ice present on the pick-up unit so that the needle of the meter which is located in the plate circuit will move from an "off" to a "0" position when power is applied to the system and there is no ice on the pick-up unit.

If desired, a thermostat may be provided for controlling the source of power supply to the system, where the system is used as an ice indicating system, for the purpose of supplying power thereto when the temperature is within the range of icing conditions. This has been illustrated in Figure 15 wherein the conductor 117 leading from the coil 116 and the conductor 131, which connects through the meter 130 to the plate 128 of the pentagrid 105, are connected with a panel board 150. The conductors 151 and 152 also connect the heater 119 for the cathode 127 to the panel board 150. A power supply has been indicated at 154 which is connected by means of the conductor 155, and also by means of the conductor 156, thermostatic switch 157 and conductor 158 to the panel board 150. With this arrangement, the power supply will be entirely disconnected from the system so long as the temperature is such that no ice can form upon the plane or other device on which the system is used. Under these conditions, the indicating meter 130 will be in its "off" position. However, as soon as the temperature decreases to a value where ice is liable to form on the plane, the thermostatic switch 157 will close and connect the power supply 154 to the system. The meter will then assume its "0" position indicating that the system is energized but that no ice has formed on the pick-up unit.

Figure 18:
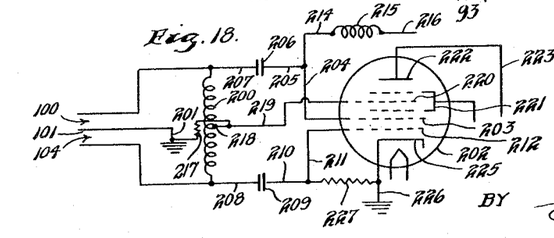
Figure 18 is a further circuit arrangement.

Figure 18 shows a further circuit arrangement which incorporates various features of my invention. In this system, the pick-up condenser 100 and the temperature compensating condenser 104 form a portion of a tank circuit which is completed by the inductance coil 200. The common plate of the two condensers 101 is grounded as shown at 201.

This system also uses a pentagrid as shown at 202, one grid 203 of which operates as a plate and is connected by means of the conductors 204 and 205, condenser 206, and conductor 207 to the tank circuit. There is a feedback connection comprising conductor 208, condenser 209, and conductors 210 and 211 which connect to the control grid 212 so that the tank circuit operates in connection with the grid 212 and plate 203 to form an oscillator. The two condensers 206 and 209 operate to prevent D. C. from reaching the tank circuit.

The oscillator is connected with a source of plate voltage through conductor 214, choke coil 215 and conductor 216. The inductance coil 200 is center tapped as shown at 218, this center tap being grounded through resistance 217, and being connected by means of conductor 219 to a second control grid 220, this grid being shielded by means of the screen 221. The plate 222 is connected by means of a conductor 223 to an indicating meter or control device, and a source of plate voltage in the same manner as in Figures 14 and 15.

The operation of this system should now be clear. Oscillations are produced in the tank circuit which, as in the previous figures, also operates as a variable impedance bridge. The bridge may be adjusted to be slightly out of balance when there is no ice on the pick-up unit so that the pentagrid will cause a slight flow of current in the plate circuit 223. When ice forms on the pick-up unit, the plate current will be increased due to the fact that the bridge will be further unbalanced and the meter may thus be calibrated to indicate the ice thickness upon the pick-up unit.

The cathode 225 is grounded as at 226 and the grid 212 is biased by means of the grid leak resistor 227.

It will be understood that the power supply to this system as well as to the system of Figure 14 may also be controlled thermostatically so that the system will be energized only when the temperatures are such that ice may form on the plane to which the system is applied.

These systems have been described in combination with an ice pick-up unit but it is to be understood that the systems have general application and need not necessarily be limited to this application. For example, it is obvious that the impedance bridge may be unbalanced not only by varying the capacity of one of the condensers but might be unbalanced by varying the inductance of one-half of the inductance coil. Various other changes and modifications of this invention will undoubtedly occur to those who are skilled in the art, and I therefore wish it to be understood that I intend to be limited only by the scope of the appended claims and not by the specific embodiments which have been disclosed herein merely for the purposes of illustration.

I claim as my invention:

1. In a device for responding to the formation of ice upon a surface, in combination, a normally rigid, plane member capable of deformation under the influence of heat to coincide with the configuration of a portion of said surface, and of maintaining said configuration when cooled, said member comprising an insulating portion and a conducting portion, means connecting said conducting portion to comprise one plate of an electrical condenser, and means for mounting said member upon deformation upon said surface so that any accretion of ice must occur in like fashion on said surface and said member, and so that a portion of any electrostatic field radiating from said plate traverses said ice.

2. A device for responding to the formation of ice, comprising in combination, a pick-up unit including one plate of a condenser and an insulating covering therefor, said unit being adapted to be mounted on a member which forms the other plate of the condenser, said covering being located in the dielectric field of said condenser whereby the formation of ice upon said covering or member will vary the capacity of said condenser, a second condenser mounted so as to be unaffected by ice formations but subject to the same temperatures as the first mentioned condenser, and means electrically responsive to the difference between the capacities of said two condensers whereby the second condenser compensates the first for capacity variations due to temperature changes.

3. In combination, a member upon which ice is liable to form during certain weather conditions, a de-icing boot covering a portion of said member, means for alternately inflating and deflating said boot for dislodging ice formations from said boot and member, a pick-up unit including one plate of a condenser mounted on said member beneath said boot, said member forming the other plate of said condenser, said boot being in the dielectric field of said condenser whereby the capacity of said condenser depends upon the thickness of the ice formation on said boot, and means electrically responsive to the capacity of said condenser.

4. In combination, a member upon which ice is liable to form during certain weather conditions, a de-icing boot covering a portion of said member, means for alternately inflating and deflating said boot for dislodging ice formations from said boot and member, a pick-up unit including one plate of a condenser mounted on said member beneath said boot, said member forming the other plate of said condenser, said boot being in the dielectric field of said condenser whereby the capacity of said condenser depends upon the thickness of the ice formation on said boot, a second condenser located so as to be subjected to the same temperature variations as said first condenser but so that its capacity will be unaffected by any ice formation, means forming the dielectric between the plates of said second condenser, said last named means being composed of the same material as that of said de-icer boot, and means electrically responsive to the difference between the capacities of the two condensers whereby the second condenser compensates the first for capacity variations due to temperature changes.

5. A device for responding to the formation of ice, comprising in combination, a first electrically insulating member, a metallic mounting member for mounting said insulating member upon the leading edge of the wing of an airplane, said insulating member having a leading surface which faces in the direction of flight, a member forming one plate of a condenser carried by said insulating member behind said leading surface, said metallic mounting member and airplane wing forming the other plate of said condenser, said insulating member and any ice forming thereon being in the dielectric field of said condenser and hence determining its capacity, said metallic mounting member forming one plate of a second condenser, a second plate for said second condenser, and a second insulating member electrically separating the plates of said second condenser, said first and second insulating members being made of substantially the same material whereby said second condenser compensates said first condenser for variation in capacity due to the effect of temperature changes on said first insulating member.

6. A device for responding to the formation of ice, comprising in combination, a first electrically insulating member, a metallic mounting member for mounting said insulating member upon the leading edge of the wing of an airplane, said insulating member having a leading surface which faces in the direction of flight, a member forming one plate of a condenser carried by said insulating member behind said leading surface, said metallic mounting member and airplane wing forming the other plate of said condenser, said insulating member and any ice forming thereon being in the dielectric field of said condenser and hence determining its capacity, said metallic mounting member forming one plate of a second condenser, a second plate for said second condenser, and a second insulating member electrically separating the plates of said second condenser, said first and second insulating members being made of substantially the same material whereby said second condenser compensates said first condenser for variation in capacity due to the effect of temperature changes on said first insulating member, said second insulating member being provided with a cut away portion, so that when said device is mounted beneath a de-icing boot said cut away portion may be filled with the same material which forms the boot whereby the second condenser compensates the first condenser for variations in capacity due to the effect of temperature upon the de-icing boot also.

7. A pick-up unit for an electrically operable ice responsive system, comprising in combination, an insulating member, means for mounting said insulating member in an opening in the leading edge of a wing of an airplane, said insulating member being so shaped and mounted that its outer surface conforms to the shape of the wing and is flush with the wing surface, and means forming one plate of a condenser, said last mentioned means being carried by said insulating member behind its outer surface, the other plate of said condenser being formed by said wing.

8. A pick-up unit for an electrically operable ice responsive system, comprising in combination, an insulating member, formed of a thermoplastic material which, upon heating, may be readily made to conform to any desired shape, means for mounting said insulating member in an opening in the leading edge of a wing of an airplane, said insulating member being so shaped and mounted that its outer surface conforms to the shape of the wing and is flush with the wing surface, and means forming one plate of a condenser, said last mentioned means being moulded wholly within said insulating member, the other plate of said condenser being formed by said wing.

9. An electrical circuit arrangement comprising, in combination: a tuned circuit having inductance and capacitance means; a coil inductively associated with said inductance means; electron discharge means including a cathode, an anode, and a plurality of control electrodes; means comprising an anode circuit for said discharge means; means connecting said tuned circuit with electrodes of said discharge means to comprise an oscillator; an impedance network including a condition responsive variable impedance member; means, including said coil, for inductively energizing said network from said oscillator; means connecting said network with electrodes of said discharge means for influencing the discharge thereof in accordance with variation of said variable impedance means; and means in said anode circuit for responding to the discharge of said discharge means.

10. An electrical circuit arrangement comprising in combination: a tuned circuit having inductance and capacitance means; a coil inductively associated with said inductance means; electron discharge means including a cathode, an anode, and a plurality of control electrodes; means comprising an anode circuit for said discharge means; means connecting said tuned circuit with electrodes of said discharge means to comprise an oscillator; an impedance network having a portion whose natural period is of the same order as the frequency of said oscillator, said network including a condition responsive variable impedance member; means including said coil for inductively energizing said network from said oscillator; means connecting said network with electrodes of said discharge means for influencing the discharge thereof in accordance with variation of said variable impedance means; and means in said anode circuit for responding to the discharge of said discharge means.

11. An ice responsive system comprising in combination, a pick up unit including an insulating plate having a face and adapted to be mounted upon a metallic member, a condenser plate carried by said insulating plate behind the face thereof so as to be insulated from said metallic member and any ice which might form on the face of said insulating plate, said metallic member forming at least a part of another condenser plate to form a condenser, whereby the capacity of said condenser is determined by the thickness of that portion of the insulating plate which lies in the dielectric field as well as the thickness of the ice forming on the metallic member and face of the insulating plate, an impedance bridge, one leg of which includes said condenser, means causing a flow of alternating current through said bridge, said bridge having a point whose potential does not vary when said bridge is balanced, said point varying in potential according to a first wave form when said bridge is unbalanced due to a change in the dielectric of said condenser, a change in the conductivity of ice on the face of said insulating plate introducing a component to said wave form which is 90° out of phase with said first mentioned wave form, and means including a vacuum tube for passing current in proportion to the amplitude of said first mentioned wave form but being relatively insensitive to the component which is 90° out of phase with said first mentioned wave form, whereby said system tends to eliminate the error introduced by the effect of temperature upon the conductivity of the ice.

12. An ice responsive system comprising in combination, a pick up unit including an insulating plate having a face and adapted to be mounted upon a metallic member, a condenser plate carried by said insulating plate behind the face thereof so as to be insulated from said metallic member and any ice which might form on the face of said insulating plate, said metallic member forming at least a part of another condenser plate to form a condenser, whereby the capacity of said condenser is determined by the thickness of that portion of the insulating plate which lies in the dielectric field as well as the thickness of the ice forming on the metallic member and face of the insulating plate, an impedance bridge, one leg of which includes said condenser, means causing a flow of alternating current through said bridge, said bridge having a point whose potential does not vary when said bridge is balanced, said point varying in potential according to a first wave form when said bridge is unbalanced due to a change in the dielectric of said condenser, a change in the conductivity of ice on the face of said insulating plate introducing a component to said wave form which is 90° out of phase with said first mentioned wave form, a vacuum tube having a cathode, plate, and first and second control grids, said cathode and first control grid forming part of the means for causing an alternating current to flow in said bridge, and means connecting said second control grid to said point in said bridge, the voltage impressed on said first control grid being in phase with said first mentioned wave form whereby electrons will flow to said plate in proportion to the amplitude of said first wave form but will not be substantiallyy affected by the voltage producing said component which is 90° out of phase with said first wave form.

13. An electrically operable ice indicating system comprising in combination, a pick up unit including an element having an electrical characteristic which varies in accordance with the thickness of the ice formation on said pick up unit, means operating a controlled device in response to changes in said electrical characteristic, an electrical power supply for said system, and thermostatic means connecting said power supply to said system when the temperature is within the range in which ice can form on the pick up unit.

14. A device for responding to change in the electrical characteristics of a varyingly heterogeneous dielectric comprising, in combination, spaced electrically conducting plates in opposed relation, said plates being exposed to a heterogeneous dielectric whereby to comprise a first electrical condenser, an electric bridge, said condenser comprising an arm of said bridge, means supplying electrical energy to said bridge, further condenser means having an unvaryingly heterogeneous dielectric, electrical characteristics of said dielectrics varying with temperature, said further condenser means comprising a second arm of said bridge, whereby to minimize change in the condition of balance of said bridge due only to change in temperature, variation in the heterogeneity of said varyingly heterogeneous dielectric causing changes in electrical characteristics of said first condenser, said bridge being unbalanced in response to the resultant of said changes, and electrical control means responsive to said unbalance of said bridge.

15. A device for responding to change in the electrical characteristics of a varyingly heterogeneous dielectric comprising, in combination, spaced electrically conducting plates in opposed relation, said plates being exposed to a heterogeneous dielectric whereby to comprise a first electrical condenser, an electric bridge, said condenser comprising an arm of said bridge, means supplying alternating current of a selected frequency to said bridge, further condenser means having an unvaryingly heterogeneous dielectric, electrical characteristics of said dielectrics varying with temperature, said further condenser means comprising a second arm of said bridge, whereby to minimize change in the condition of balance of said bridge due only to change in temperature, variation in the heterogeneity of said varyingly heterogeneous dielectric causing changes in electrical characteristics of said first condenser, said changes causing a resultant unbalance potential in the output of said bridge, said potential having a first component due solely to change in a first of said electrical characteristics and having a second component due solely to change in a second of said characteristics, said components being of said selected frequency and being mutually displaced in phase, and electrical means for performing a supervisory function in response to the magnitude only of said resultant potential.

16. In electrostatic means for indicating solidification of a material in a zone normally occupied by a fluid including said material in a fluid state: a first capacitor comprising a pair of plates of electrically conductive material having adjacent edges spaced to define a dielectric gap between said plates, said capacitor being so located in said zone that said matter adheres to said plates upon solidification and bridges said gap, at least one of said plates including an insulating outer lamina; a second capacitor located for subjection to the same ambient temperature as said first capacitor but for relative freedom from said solidifying matter, said second capacitor having a plate in common with said first capacitor; and an electric circuit including said capacitors and providing means for automatic actuation in response to said solidification of said material in said zone.

WALDO H. KLIEVER.

REFERENCES CITED

The following references are of record in the file of this patent:

UNITED STATES PATENTS

| Number | Name | Date |
|---|---|---|
| 2,071,148 | Weisberg et al. | Feb. 16, 1937 |
| 2,127,823 | Leifheit | Apr. 23, 1938 |
| 2,294,674 | Lord | Sept. 1, 1942 |
| 2,311,396 | Judkins | Feb. 16, 1943 |
| 2,108,202 | Kelly | Feb. 15, 1938 |
| 2,290,771 | Shepard | July 21, 1942 |
| 1,969,518 | Moles | Aug. 7, 1934 |
| 2,139,474 | Shepard | Dec. 6, 1938 |
| 2,182,530 | Baer | Dec. 5, 1939 |

FOREIGN PATENTS

| Number | Country | Date |
|---|---|---|
| 482,511 | Great Britain | Mar. 28, 1938 |
| 609,661 | Germany | Feb. 19, 1935 |